United States Patent [19]

Souza

[11] 4,253,264

[45] Mar. 3, 1981

[54] REPEATING ANIMAL TRAP

[75] Inventor: Anthony J. Souza, Lancaster, Pa.

[73] Assignee: Woodstream Corporation, Lititz, Pa.

[21] Appl. No.: 7,835

[22] Filed: Jan. 30, 1979

[51] Int. Cl.³ .............................................. A01M 1/12
[52] U.S. Cl. ...................................................... 43/73
[58] Field of Search .......................... 43/72, 73, 74, 75

[56] References Cited

U.S. PATENT DOCUMENTS

| 1,620,950 | 3/1927 | Coffman | 43/73 |
| 1,723,121 | 8/1929 | Barwicki | 43/74 |
| 1,758,952 | 5/1930 | Kness | 43/74 |

Primary Examiner—Harold D. Whitehead
Attorney, Agent, or Firm—Holman & Stern

[57] ABSTRACT

A repeating animal trap particularly for rodents such as rats and mice has a trapping passageway into which animals are attracted due to their inherent curiosity. A trigger within the passageway is tripped by animal pressure and this sets in motion a reciprocatory sweeping mechanism which sweeps the animal from the passageway into an adjacent collecting compartment. The reciprocatory mechanism then returns to its initial position in which it defines longitudinal walls of the passageway to effectively prevent an animal in the collection compartment from pushing its way back into the passageway. A constant force coil spring is used to power the sweeping mechanism with a control system that insures only a single reciprocation of the sweeping mechanism each time the trigger is activated so that the trap operates effectively on successive animals throughout the range of displacement of the spring.

5 Claims, 6 Drawing Figures

REPEATING ANIMAL TRAP

BACKGROUND OF THE INVENTION

This invention relates to animal traps of the type used for sequential trapping and collecting a number of small rodent-type animals such as rats or mice.

It is known to provide baitless-type mouse or rat traps which utilize the animal's inherent curiousity to lure it into a capture opening or the like in which one or other kind of trigger mechanism is actuated that in turn operates a transfer mechanism by which the animal is moved into an escape-proof collection chamber or compartment. Such traps are generally self-setting so that they can be used to trap and collect a number of animals, dependent on the size of the collection chamber and the number of trapping and transfer operations the trap can perform if it utilizes power means of limited duration to perform the various operations.

One known form of repeating trap of the above type comprises a housing defining a trapping passageway with entrances at either end and a collection compartment adjacent to the passageway. A rotary cylinder having radially extending vanes is mounted in the housing in such a manner that two adjacent vanes form the opposite longitudinal wall to the passageway. The cylinder is spring urged to rotate in one direction and an escapement type mechanism holds the cylinder against rotation until a trigger in the passageway is pressed by an animal. On depression of the trigger, the escapement mechanism is released, the cylinder rotates rapidly to sweep an animal from the passageway into the capture compartment and the escapement mechanism then arrests the cylinder with the next succeeding set of vanes defining the passageway walls so that the operation can be repeated as successive animals enter the passageway until the spring runs down.

It has been found with the above arrangement, however, that as the spring runs down, there may not be sufficient force to sweep an animal from the passageway into the collection compartment, the cylinder may come to rest in an intermediate position leaving an escape opening between the collection compartment and the passageway and further, that it may under certain circumstances be possible to rotate the cylinder in the reverse direction allowing access to the passageway for animals in the collection compartment.

It is an object of the present invention to provide a repeating animal trap of the type described having a wind-up type power means which can operate reliably to sweep successive animals into a collection compartment of the trap throughout the entire duration of operation of the power means.

It is a further object of the invention to provide a repeating animal trap of the type comprising a trapping passageway, a collection compartment and a sweeping mechanism which is designed effectively to preclude animals in the collection compartment from re-entering the trapping passageway.

Another object of the invention is to provide a simple, economical and readily portable repeating animal trap which can operate in any convenient location without the need for an external power source.

BRIEF SUMMARY OF THE INVENTION

A repeating animal trap in accordance with the invention comprises a generally rectangular housing defining a trapping passageway extending across the housing and having entrances for animals to be trapped in its opposite ends in opposed side walls of the housing. On one side of the passageway, the housing defines a collection compartment for trapped animals and on the other side of the passageway a further compartment houses a drive for a reciprocatory sweeping mechanism that sweeps animals from the passageway into the collection compartment. The reciprocatory sweeping mechanism takes the form of a pair of opposed walls which in one terminal position thereof define the longitudinal walls of the passageway. A trigger is provided in the passageway which, when depressed by an animal, causes the drive to move the wall members through a single reciprocatory motion in the course of which they move rapidly from the terminal position towards the collection compartment to sweep the animal from the passageway into the collection compartment and rapidly return to the terminal position thereby effectively blocking communication between the passageway and the collection compartment until a subsequent depression of the trigger means, so that animals cannot return from the collection compartment into the passageway.

The drive for reciprocating the wall members is in the form of a wind-up mechanical drive employing a coiled constant-rate spring for applying continuous torque to a main drive wheel which in turn imparts reciprocatory motion to the wall members through a crank linkage. The trigger operates a stop mechanism for the main drive wheel which is released when the trigger is depressed by an animal, allowing the drive wheel to rotate and operate the sweeping mechanism. Once the trigger has been depressed and is relieved of the depressing force, a counterweight returns the trigger to its initial position and causes the stop to prevent the drive wheel rotating through more than a single revolution thereby restraining movement of the reciprocatory wall members to a single reciprocation.

The use of a constant force spring is directed towards insuring that the sweeping mechanism will operate with sufficient power to sweep animals into the collection compartment even as the spring approaches the end of its displacement range and the crank and stop mechanism is arranged to prevent the wall members from being displaced backwardly from their terminal position insuring effective closure between the passageway and the collection compartment.

DESCRIPTION OF PREFERRED EMBODIMENT

Figure 1:
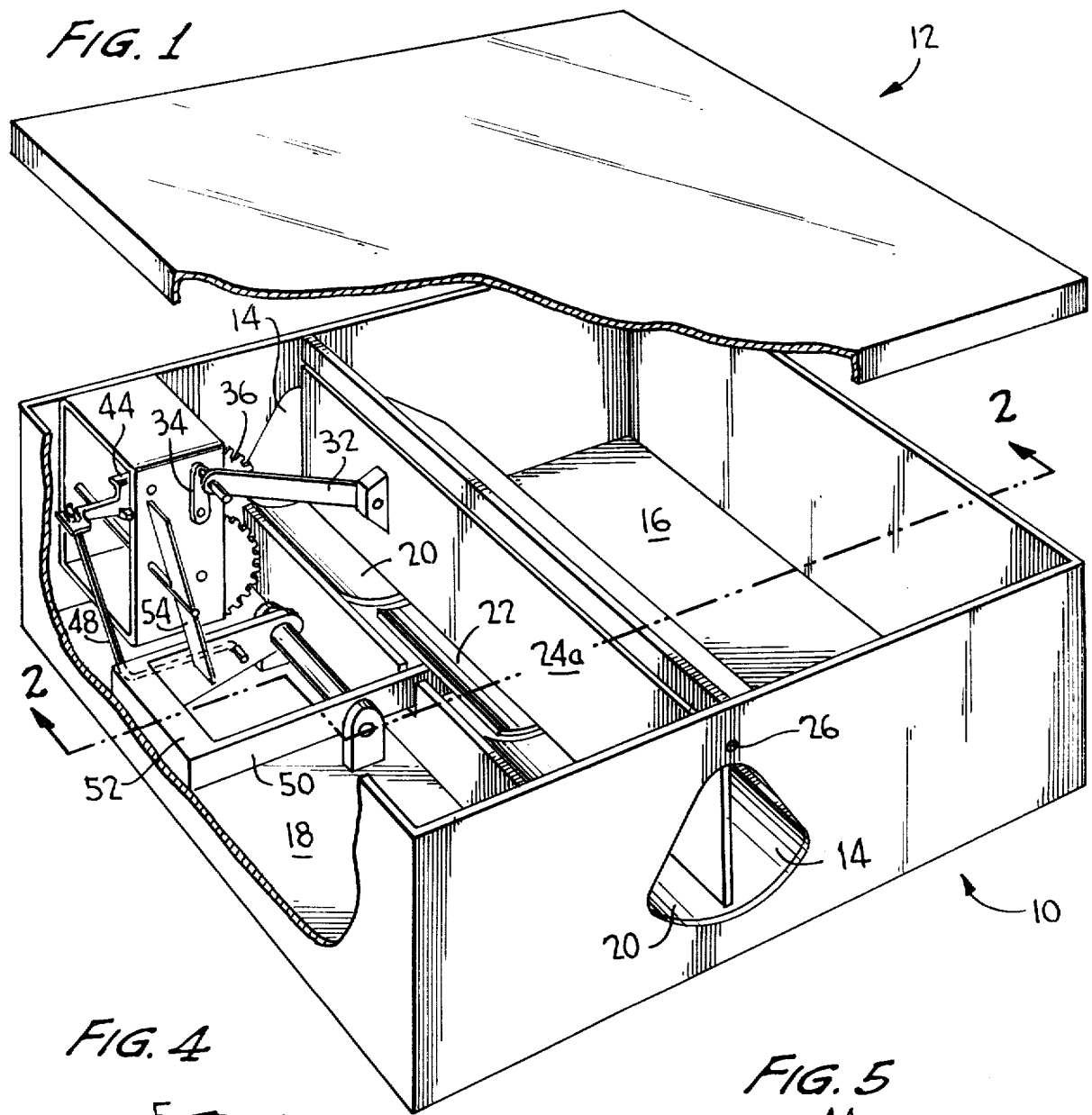
FIG. 1 is a perspective view, part broken away, of a repeating animal trap according to the invention.
Figure 4:
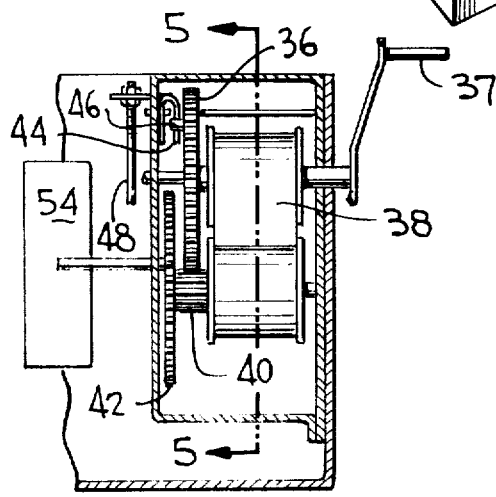
FIG. 4 is an end view of the drive for the sweeping mechanism.
Figure 5:
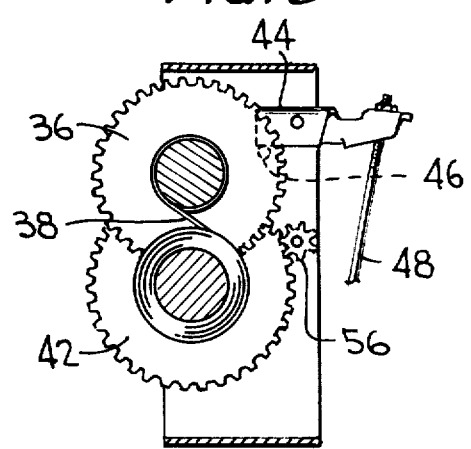
FIG. 5 is a sectional view of the drive mechanism on line 5—5 of FIG. 4.

The illustrated animal trap, designed primarily for trapping small rodents such as rats or mice, comprises a generally rectangular container 10 with a removable cover 12, the container defining a generally centrally located trapping passageway having entrance openings 14 at its opposite ends formed in side walls of the container. Within the container is a collecting compartment 16 on one side of the central passageway and a further compartment 18 on the other side of the passageway housing a drive arrangement for the moving parts of the trap as will be described.

Figure 2:
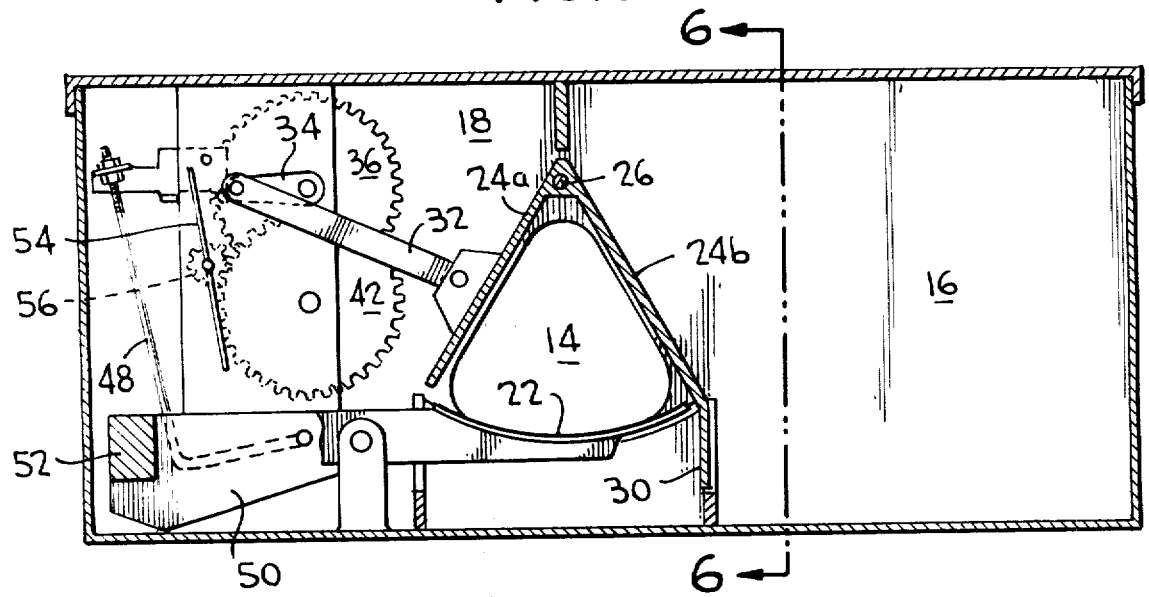
FIG. 2 is a sectional view of the trap on line 2—2 of FIG. 1 and showing the trap sweeping mechanism in one terminal position.

The passageway has fixed floor sections 20 leading from the respective openings 14 and defining a gap therebetween containing a trigger or pedal 22 which in the set position of the trap as shown in FIGS. 1 and 2, is flush with the upper surfaces of floor sections 20. Passageway side walls are defined by a pair of wall members 24a and 24b forming a reciprocatory mechanism for sweeping an animal from the passageway into the collection compartment. Wall members 24a and 24b are integrally connected and pivoted at their upper ends about a horizontal axle journalled at 26 in the container side walls.

Figure 3:
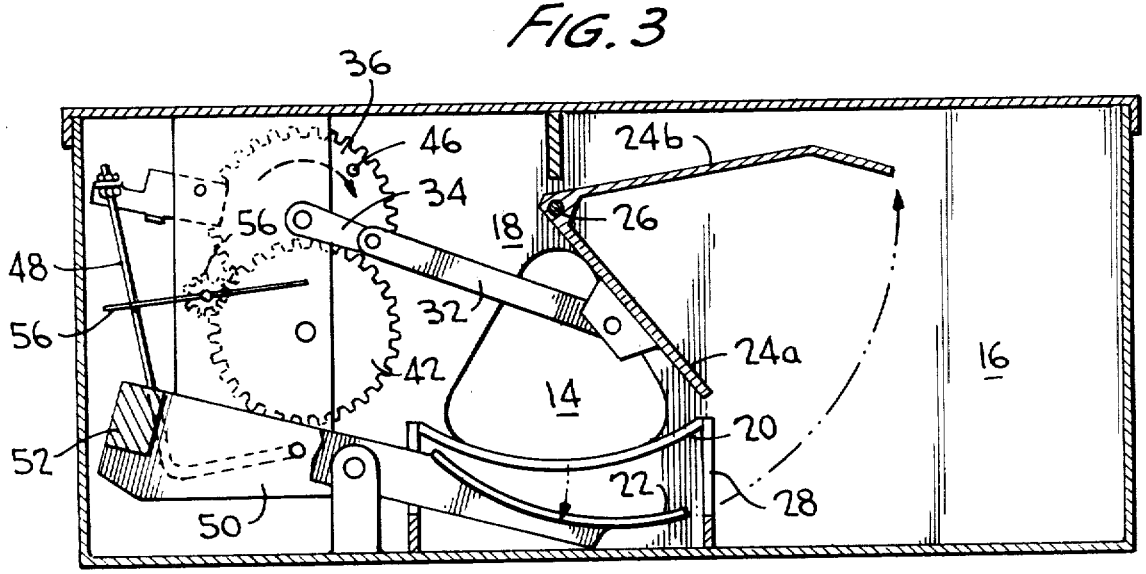
FIG. 3 is a view similar to FIG. 2 showing the sweeping mechanism in its other terminal position.
Figure 6:
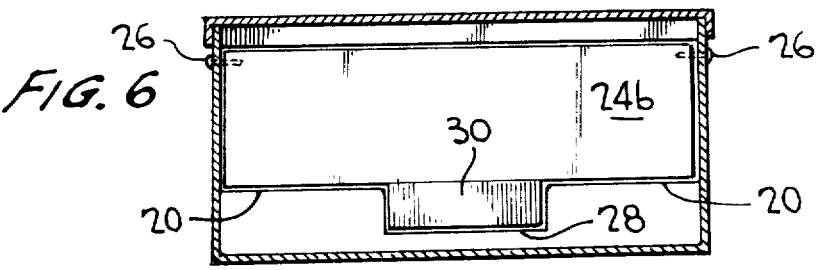
FIG. 6 is a sectional view on line 6—6 of FIG. 1.

Operation of the trap as thus far described is as follows:

When an animal enters the passageway via either of the entrance openings 14 and depresses the trigger 22, a drive mechanism (to be described) causes the wall members 24a, 24b rapidly to perform a single reciprocatory movement from the position shown in FIG. 2 to the position shown in FIG. 3 and back. In the course of moving from the FIG. 2 to the FIG. 3 position, wall member 24a sweeps the animal into the collection compartment and on return of the reciprocatory mechanism to the FIG. 2 position, communication between the passageway and the collection compartment is effectively closed, preventing escape of the animal from the collection compartment.

When the animal depresses the trigger, a part of the animal may fall below the upper level of the passageway floor sections 20 and accordingly a gap 28 is provided in the struction supporting the floor sections to facilitate sweeping of the animal into the collection compartment. This gap is covered in the FIG. 2 condition of the apparatus by a flap 30 integral with side wall member 24b.

The drive arrangement for providing a single reciprocation of the sweeping mechanism each time the trigger 22 is depressed, comprises a crank linkage 32, 34 pivoted to wall member 24a, a crank drive wheel 36 and a wind-up, constant force coil spring 38 providing a continuous torque tending to retain drive wheel 36 in constant rotation. The spring, which may be any type of conventional constant force coil spring, for example a "Neg'ator" (Registered trademark) spring as manufactured by Ametek Hunter Spring Division, One Spring Ave., Hatfield, Pa. 19440, is wound between the shaft carrying drive wheel 36 and a subsidiary shaft carrying further gear wheels 40 and 42, so that when the spring is wound up by means of a wind-up handle 37, a constant torque is applied to wheel 36.

Wheel 36 is constrained against its tendency to rotate under the influence of spring 38 by a stop mechanism linked to trigger 22 and which also insures that wheel 36 only performs a single revolution (with a consequent single reciprocation of the sweeping mechanism) each time the trigger is depressed. This stop mechanism comprises a pivoted stop 44 engaging a projecting lug 46 on wheel 36 and a lever 48 connected between stop 44 and a pivotal table 50 carrying the trigger 22 at its one end and a trigger counterweight 52 at its opposite end. When the trigger is in its upper position as shown in FIGS. 1 and 2 prior to depression by an animal in the passageway, stop 44 engages lug 46 to hold wheel 36 against rotation but when the trigger is depressed as shown in FIG. 3, stop 44 releases lug 46, allowing wheel 36 to rotate under the influence of spring 38.

Operation of the above-described drive mechanism is as follows:

When an animal depresses the trigger 22, stop 44 releases lug 46, allowing wheel 36 to rotate under the influence of spring 38 so that the crank 32, 34 causes the sweeping mechanism to reciprocate and sweep the animal from the passageway into the collection compartment. When the trigger is relieved of the animal's weight, counterweight 52 returns the trigger to its original set position and also returns the stop 44 to the position shown in FIG. 2 so that it will arrest wheel 36 (by engagement of lug 46) after completion of a single revolution of the wheel. Accordingly the sweeping mechanism is also constrained to perform just a single reciprocation each time the trigger is depressed.

The drive mechanism is complete by a governor arrangement for restraining the speed of rotation comprising a high speed rotary air vane 54 driven from wheel 36 via gear wheels 40 and 42 on the subsidiary shaft and gear wheel 56 on the shaft carrying the air vane.

It will be appreciated that by using a constant force spring in the manner described, substantially the same sweeping force will be exerted on an animal for each operation of the trap so that provided a spring of adequate power is chosen, sufficient force will be delivered throughout the displacement range of the spring so that each sweeping movement should be effectively complete and wall members 24a and 24b return to the FIG. 2 position each time, effectively to ensure that the collection compartment is sealed from the passageway by the wall member 24b. Further, since the crank is substantially in its inner dead center condition in the FIG. 2 position of the trap, and lug 46 is in engagement with stop 44, animals in the collection compartment cannot effectively push wall member 24b rearwardly to obtain access to the passageway even when the spring is run down.

While one specific embodiment of the invention has been described herein in detail, it will be appreciated that the invention is not limited to the specific features herein described and numerous modifications can be made within the scope of the invention as defined in the attached claims.

I claim:

1. In a repeating animal trap comprising a housing defining an animal-trapping passageway having at least one entrance opening and an animal collecting compartment adjacent said passageway, a trigger means in said passageway, a sweeping mechanism for sweeping an animal from said passageway into said compartment, a repeating drive means for operating said sweeping mechanism on actuation of said trigger means by an animal in said passageway, resetting means for automatically resetting said trigger means subsequent to actuation thereof and power means for providing said drive means with sufficient power for plural operations of said sweeping mechanism, the improvement wherein said animal collecting compartment is located laterally of said passageway and wherein said sweeping mechanism comprises a pair of reciprocatory wall members having one terminal position in which said wall members define opposed longitudinal walls of said passageway and said drive mechanism comprises means for providing a single reciprocation of said wall members on actuation of said trigger means in which said wall members move from said one terminal position toward said collecting compartment and return to said one terminal position, said drive means including a crank linkage connected to one of said wall members, a rotary drive wheel actuated by said power means for operating said crank linkage and a stop mechanism associated with said trigger means for constraining said drive wheel to perform a single revolution under the influence of said power means on actuation of said trigger means, said stop mechanism comprising an abutment means on said drive wheel, a stop member movable into and out of engagement with said abutment means and a linkage between said stop member and said trigger means for moving said stop member out of engagement with said abutment means on actuation of said trigger means to permit rotation of said drive wheel and for moving said stop member back to engage said abutment means when said trigger means is automatically reset by said resetting means to constrain said wheel to a single revolution, said power means comprising a constant force spring for applying continuous torque to said drive wheel and manual wind-up means for tensioning said spring, said crank linkage of the drive means being positioned in a dead center condition when said wall members are in said terminal position and said abutment means being in engagement with said stop member when said wall members are in said terminal position, thus maintaining said wall members in said terminal position whenever said wall members are not being operated by said drive means, to prevent animals in the animal collecting compartment from gaining access to the passageway by the use of lateral force applied against said wall members.

2. The improvement of claim 1 wherein said wall members are integrally connected and mutually pivoted along upper edges thereof about an axle journalled in opposed side walls of said housing.

3. The improvement of claim 1 wherein said trigger means is carried by a pivoted table mounted in said housing, said resetting means comprises a counterweight means associated with said table and said linkage is connected between said table and said stop member.

4. The improvement of claim 1 including governor means for restraining the speed of rotation of said drive wheel comprising a rotary air vane means and gear means between said drive wheel and said air vane means for rotating said air vane means in conjunction with said drive wheel and at an increased speed of rotation.

5. The improvement of claim 1 wherein said trigger means defines part of a basewall means of said passageway, said basewall means further comprising base walls and supporting structures at opposite ends of said trigger means, said supporting structures defining a gap therebetween in the region of said trigger means, and one of said wall members including a dependent flap closing said gap when said sweeping mechanism is in said one terminal position.

* * * * *